Jan. 15, 1957 H. M. KNOTH 2,777,167
COTTON-BOLL-SEPARATING APPARATUS
Filed Jan. 3, 1955
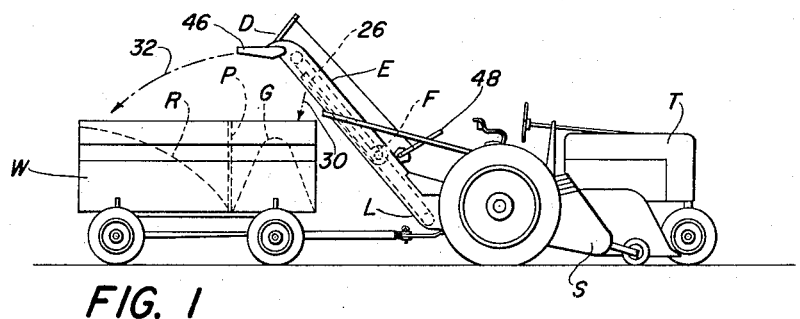
FIG. 1
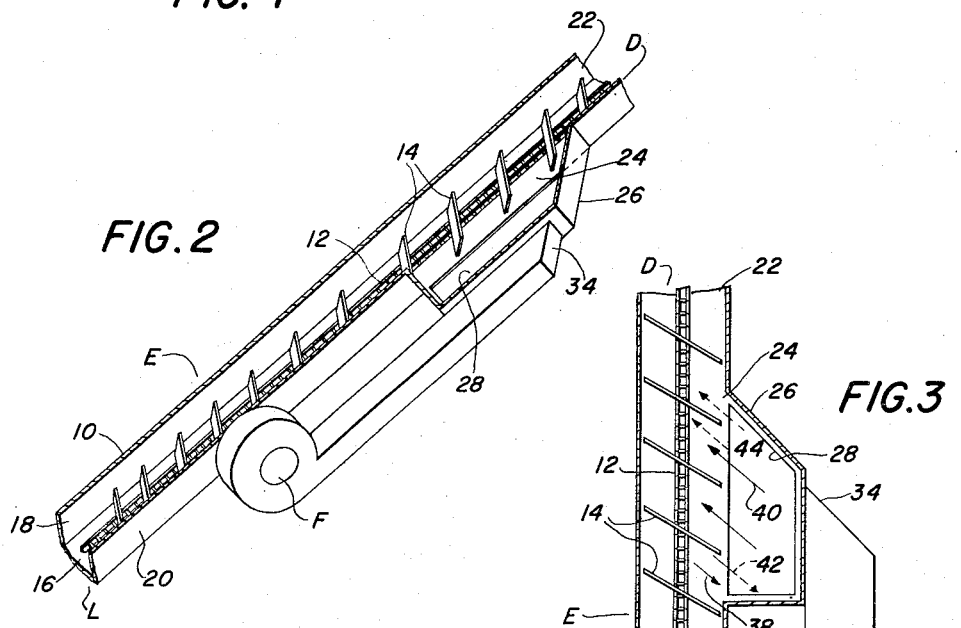
FIG. 2
FIG. 3
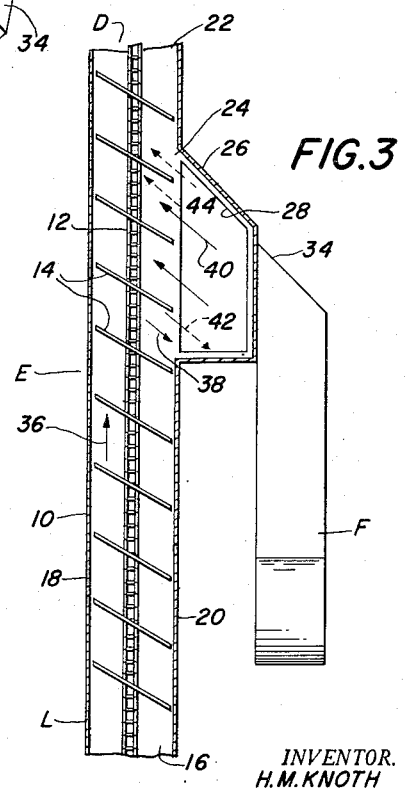
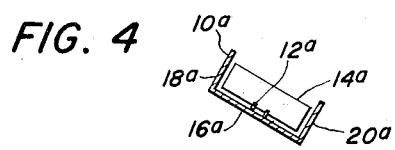
FIG. 4
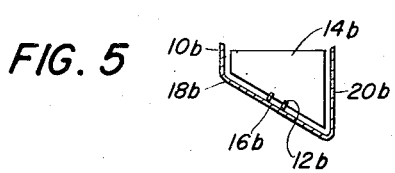
FIG. 5
INVENTOR.
H. M. KNOTH United States Patent Office 2,777,167
Patented Jan. 15, 1957

2,777,167

COTTON-BOLL-SEPARATING APPARATUS

Harold M. Knoth, Davenport, Iowa, assignor to Deere & Company, Moline, Ill., a corporation of Illinois Application January 3, 1955, Serial No. 479,489

7 Claims. (Cl. 19—72)

This invention relates to apparatus for handling cotton bolls and more particularly to means for separating green bolls from ripe bolls.

There are at present two commercially exploited methods of picking cotton from the field. One of these is the spindle method in which a suitable machine having rotating spindles is operated over a cotton field to pick or pluck the cotton from ripe open bolls on the cotton plant. In this method of harvesting, there is a minimum accumulation of unripe or green bolls, since the picking mechanism is designed to leave the green bolls on the plant for later picking when they have ripened.

The other method is the stripper method in which the cotton harvester is equipped with means providing an elongated slot through which the plants are caused to pass as the harvesting machine travels over the field. In a machine of this type, ripe and green bolls are indiscriminately stripped from the standing plants. Although this method has certain advantages over the spindle method, there is inherent therein the problem of separating the ripe bolls from the green bolls and it is preferred that some sort of preliminary separation be accomplished in the field.

The conventional cotton stripper comprises one or more stripper units mounted on an agricultural tractor behind which is towed a wagon or trailer into which the indiscriminately intermingled ripe and green bolls are discharged by an elevator leading from the stripper unit or units.

Green bolls are relatively heavy and compact as compared with ripe bolls, primarily because their moisture content is higher, whereas the ripe bolls have a lower moisture content and the cotton bursting out of them makes them lighter and fluffier. The differences in weight and size characteristics give rise to important differences in the manner in which the two can be handled. Although it is conceivable that special equipment could be provided for handling the two types of bolls, it must be borne in mind that economy dictates a simple expedient that can be used preferably as a part of the harvesting equipment.

It was formerly conceived that the use of an air blast at the discharge end of the wagon elevator would serve to separate the ripe bolls from the green bolls, the theory being that the air blast would blow the lighter bolls farther rearwardly in the trailing wagon while the heavier green bolls would be unaffected by the air blast and would drop to the forward part of the wagon. But as a practical matter, the system does not operate in this fashion because the acceleration of the green bolls as they depart from the upper end of the conveyor substantially equals the acceleration given to the ripe bolls by the air blast, with the result that separation is not accomplished and both types of bolls are intermingled in the wagon or other receptacle.

According to the present invention, the separation apparatus is improved by the provision of means for moving indiscriminately intermingled ripe and green bolls along a defined path, the end of which terminates in a first discharge opening. A second discharge opening is provided at one side of the moving means ahead of the first opening and means is provided for influencing all of the bolls toward the second opening, which means that ordinarily all of the bolls would move outwardly through the second opening. However, the influence on all the bolls is counteracted by means, preferably pneumatic, for urging the lighter and ripe bolls back onto the moving means, whereby the ripe bolls are conveyed out through the first opening. Consequently, the separation means has a pair of exits, one for ripe bolls and the other for the heavier green bolls. It is an object of the invention to achieve the improved apparatus in the form of a modification of an existing conveyor system of the type common to several commercially known cotton strippers, whereby the system may be supplied as original equipment or as an attachment for machines already built.

The foregoing and other important objects and desirable features inherent in and encompassed by the invention will become apparent as preferred embodiments of the invention are disclosed in detail in the ensuing specification and accompanying sheet of drawings, the several figures of which will be described immediately below.

Fig. 1 is a side elevational view of a tractor-mounted cotton harvester and trailing wagon or receptable into which the conveyor system discharges ripe and green bolls separately.

Fig. 2 is a perspective, partly in section, of one form of conveyor means.

Fig. 3 is a plan view, partly in section, of the structure shown in Fig. 1.

Fig. 4 is a transverse section of a modified form of conveyor means.

Fig. 5 is a transverse section of a still further modified form of conveyor means.

For the purpose of presenting an over-all picture of what is involved, reference will be had first to Fig. 1. The harvester shown there is of the vehicle-mounted type comprising a stripper unit S carried at the right-hand side of a tractor T for stripping cotton from standing plants as the tractor is advanced over the field. A representative stripper harvester of this type is shown in U. S. Patent 2,533,510. The harvester is provided at its rear end with an upwardly inclined elevator or conveyor means E having a discharge end D located over the box of a trailing wagon W. As the harvester progresses over the field, the stripper unit strips both ripe and green bolls from the plants, and these bolls are introduced into the lower or receiving end L of the conveyor means E and are conveyed by the conveyor means to the discharge zone at D for discharge into the wagon W. Omitting for the moment the details of the invention, the desired result is that the ripe and green bolls are separated so as to be received by the wagon in separate piles or compartments R and G. The wagon is shown as having a partition P for maintaining the separation.

The conveyor means E includes an elongated trough element 10 and a flighted element 12 preferably in the form of an endless chain conveyor including a plurality of generally transverse, longitudinally spaced apart conveyor flights 14. The trough element 10 is made up of a bottom 16 and a pair of laterally spaced apart upright side walls 18 and 20. The bottom and walls are inclined upwardly so that the receiving zone L is at a lower level than the discharge zone D, the upper ends of the walls and bottom terminating in a first opening affording a ripe boll exit 22.

Just ahead of the discharge zone D, the upper portion of the trough side wall 20 is interrupted to provide a side opening 24, which opening affords a green boll exit. The structure of the conveyor includes a box-like affair 26 having a bottom opening 28 through which the green bolls ultimately drop. The relationship of the structure, as between the tractor T and the wagon W, is such that the green bolls, when discharged, follow the path of the arrow 30 and the discharged ripe bolls follow the path of the arrow 32 (Fig. 1), whereby the bolls are discharged respectively into the piles or compartments G and R.

Fig. 1 may be taken as representative of all forms of the invention disclosed; that is, it is intended that it will furnish a background organization for further explanation of the several forms illustrated.

That form of the invention shown primarily in Figs. 2 and 3 embodies, as do the other forms of the invention, the flighted element 12—14 operative to move lengthwise of the trough element 10 to move indiscriminately intermingled ripe and green bolls from the receiving end or zone L to the discharge zone D. It is a feature of the invention that means is provided for influencing all of the bolls toward the wall 20 in which the side or green boll opening 24 is provided, thereby causing all of the bolls to move toward that side and tending to exit through the green boll exit 24—28. The means for influencing all of the bolls in that direction here comprises the arrangement of the flights 14 which, as best seen in Fig. 3, are angled laterally of the conveyor trough 10 so as to be inclined downhill toward the green boll exit 24—28. If this were all that were involved in the invention, all of the bolls would drop through the bottom 28 in the box 26. However, the purpose of the invention is to afford a design that will result in separation of the lightweight ripe bolls from the heavier green bolls. For this purpose, the invention includes means for counteracting the influence on the bolls, which means is effective only on the lighter ripe bolls, permitting the green bolls to drop through the opening 28 while causing the ripe bolls to revert to the flighted element 12—14 for ultimate discharge at the ripe boll exit 22. As illustrated, the counteracting means here takes the form of pneumatic means, indicated generally as a fan F having a discharge conduit 34 leading into the side wall of the box 26. The fan is thus enabled to deliver a blast of air crosswise of the green boll exit 24—28 for blowing the ripe bolls back onto the flighted element 12—14 while permitting the heavier bolls to continue through the opening 24—28. This result is accomplished because the ripe bolls, being lighter than the green bolls, are influenced by the air blast and the green bolls are not. Thus, the gravitation of all the bolls toward the green boll exit 24—28 is counteracted in effect by the air blast from the fan discharge 34.

In Fig. 3, the arrow 36 indicates the over-all direction of movement of the flighted element 12—14 along its path from the receiving zone L to the discharge zone D. The arrow 38 represents the gravitation of all the bolls toward the green boll exit 24—28. The arrows 40 represent the direction of the air blast from the fan F. The dotted line arrows 42 illustrate the continuation of the green bolls through the green boll exit and the dotted-line arrows 44 represent the reversion of the ripe bolls back to the flighted element 12—14.

In that form of the invention shown in Figs. 2 and 3, the flights 14 of the flighted element are inclined, as previously described, to cause the gravitation of the bolls to the right or toward the green boll exit 24—28, which result is readily accomplished in combination with the general uphill inclination of the conveyor means or elevator E.

In Fig. 4, there is shown a conveyor trough 10a having a bottom 16a and opposite sides 18a and 20a. Here, the bottom 16a is inclined laterally so as to effect the gravitational influence of the bolls toward the side opening 24. In this case, the flights 14a may be perpendicular to the length of the conveyor chain 12a.

Fig. 5 shows a modified conveyor trough 10b having a bottom 16b and sides 18b and 20b. Again, the characteristic of this form of the invention is the lateral inclination of the bottom 16b, but the flight 14b, attached to the chain 12b, is of the configuration shown to improve the capacity of the conveyor system.

In any case, the bolls are indiscriminately influenced toward discharge through the green boll exit but this influence is counteracted as to only the ripe bolls so that the ripe bolls are moved back onto the moving means—comprising the flighted element 12—14—for ultimate discharge separately through the ripe boll exit 22 while the green bolls are permitted to gravitate through the green boll exit 24—28. As previously described, these openings are spaced apart so as to accomplish separate reception of the ripe and green bolls in the piles or compartments R and G, respectively. As further illustrated in Fig. 1, the upper end of the elevator E may be equipped with a deflector 46 which, by means of a control lever 48, may be adjusted to regulate the path of discharge of the ripe bolls. However, such deflectors are conventional and that type illustrated here need not be further described.

Various features not categorically enumerated herein will undoubtedly occur to those versed in the art, as likewise will further variations in the forms of the invention illustrated, all of which may be accomplished without departing from the spirit and scope of the invention.

What is claimed is:

1. Cotton-boll-separating apparatus, comprising: conveyor means including an elongated trough element and a flighted element movable lengthwise along said trough element to move indiscriminately intermingled green bolls and relatively lighter-weight ripe bolls along said trough element from a receiving zone to a discharge zone, said trough element having in said discharge zone a first opening generally in alinement with the length of said trough element and affording a ripe boll exit, said trough further having a second opening ahead of and offset laterally to one side of said trough element from the first opening and affording a green boll exit; one of said elements being inclined laterally of the length of the trough element and downhill toward the green boll exit to cause all bolls to tend to gravitate toward said green boll exit; and pneumatic means associated with the conveyor means and having an air outlet leading into and crosswise of the green boll exit for directing against the gravitating bolls an air blast of such intensity as to counter-act the gravitation of the lighter ripe bolls while permitting such gravitation of the green bolls, whereby the green bolls move through the green boll exit and the ripe bolls are influenced back onto the flighted portion to continue on to and through the ripe boll exit.

2. Cotton-boll-separating apparatus, comprising: conveyor means including an elongated trough element and a flighted element movable lengthwise along said trough element to move indiscriminately intermingled green bolls and relatively lighter-weight ripe bolls along said trough element from a receiving zone to a discharge zone, said trough element having in said discharge zone a first opening generally in alinement with the length of said trough element and affording a ripe boll exit, said trough further having a second opening ahead of and offset laterally to one side of said trough element from the first opening and affording a green boll exit; said trough element having a bottom inclined laterally of the length of the trough element and downhill toward the green boll exit to cause all bolls to tend to gravitate toward said breen boll exit; and pneumatic means associated with the conveyor means and having an air outlet leading into and crosswise of the green boll exit for directing against the gravitating bolls an air blast of such intensity as to counter-act the gravitation of the lighter ripe bolls while permitting such gravitation of the green bolls, whereby the green bolls move through the green boll exit and the ripe bolls are influenced back onto the flighted portion to continue on to and through the ripe boll exit.

3. Cotton-boll-separating apparatus, comprising: conveyor means including an elongated trough element and a flighted element movable lengthwise along said trough element to move indiscriminately intermingled green bolls and relatively lighter-weight ripe bolls along said trough element from a receiving zone to a discharge zone, said trough element having in said discharge zone a first opening generally in alinement with the length of said trough element and affording a ripe boll exit, said trough further having a second opening ahead of and offset laterally to one side of said trough element from the first opening and affording a green boll exit; said trough element being inclined uphill so that its discharge zone is higher than its receiving zone, and said flighted element having flights spaced lengthwise of the trough element and inclined laterally of the length of the trough element and downhill toward the green boll exit to cause all bolls to tend to gravitate toward said green boll exit; and pneumatic means associated with the conveyor means and having an air outlet leading into and crosswise of the green boll exit for directing against the gravitating bolls an air blast of such intensity as to counter-act the gravitation of the lighter ripe bolls while permitting such gravitation of the green bolls, whereby the green bolls move through the green boll exit and the ripe bolls are influenced back onto the flighted portion to continue on to and through the ripe boll exit.

4. Cotton-boll-separating apparatus, comprising: conveyor means including an elongated trough element and a flighted element movable lengthwise along said trough element to move indiscriminately intermingled green bolls and relatively lighter-weight ripe bolls along said trough element from a receiving zone to a discharge zone, said trough element having a bottom and a pair of laterally spaced apart upright side walls leading to a first opening generally in alinement with the length of said trough element and affording a ripe boll exit in said discharge zone, one of said walls having an opening therein ahead of said ripe boll exit and affording a green boll exit; one of said elements being inclined laterally of the length of the trough element and downhill toward the wall having said green boll exit opening to cause all bolls to tend to gravitate toward said green boll exit; and pneumatic means associated with the conveyor means and having an air outlet leading into and crosswise of the green boll exit for directing against the gravitating bolls an air blast of such intensity as to counter-act the gravitation of the lighter ripe bolls while permitting such gravitation of the green bolls, whereby the green bolls move through the green boll exit and the ripe bolls are influenced back onto the flighted portion to continue on to and through the ripe boll exit.

5. Cotton-boll-separating apparatus, comprising: conveyor means including an elongated trough element and a flighted element movable lengthwise along said trough element to move indiscriminately intermingled green bolls and relatively lighter-weight ripe bolls along said trough element from a receiving zone to a discharge zone, said trough element having a bottom and a pair of laterally spaced apart upright side walls leading to a first opening generally in alinement with the length of said trough element and affording a ripe boll exit in said discharge zone, one of said walls having an opening therein ahead of said ripe boll exit and affording a green bolt exit; the bottom of said trough element being inclined laterally of said trough element and downhill toward the green boll exit opening to cause all bolls to tend to gravitate toward said green boll exit; and pneumatic means associated with the conveyor means and having an air outlet leading into and crosswise of the green boll exit for directing against the gravitating bolls an air blast of such intensity as to counter-act the gravitation of the lighter ripe bolls while permitting such gravitation of the green bolls, whereby the green bolls move through the green boll exit and the ripe bolls are influenced back onto the flighted portion to continue on to and through the ripe boll exit.

6. Cotton-boll-separating apparatus, comprising: conveyor means including an elongated trough element and a flighted element movable lengthwise along said trough element to move indiscriminately intermingled green bolls and relatively lighter-weight ripe bolls along said trough element from a receiving zone to a discharge zone, said trough element having a bottom and a pair of laterally spaced apart upright side walls leading to a first opening generally in alinement with the length of said trough element and affording a ripe boll exit in said discharge zone, one of said walls having an opening therein ahead of said ripe boll exit and affording a green boll exit; said trough element being inclined lengthwise uphill so that the ripe boll exit opening is elevated as respects the green boll exit, and said flighted element having a plurality of flights spaced apart along and angled relative to the length of the trough element so as to be inclined laterally of the length of the trough element and downhill toward the wall having said green boll exit opening to cause all bolls to tend to gravitate toward said green boll exit; and pneumatic means associated with the conveyor means and having an air outlet leading into and crosswise of the green boll exit for directing against the gravitating bolls an air blast of such intensity as to counter-act the gravitation of the lighter ripe bolls while permitting such gravitation of the green bolls, whereby the green bolls move through the green boll exit and the ripe bolls are influenced back onto the flighted portion to continue on to and through the ripe boll exit.

7. Cotton-boll-separating apparatus, comprising: conveyor means including an elongated trough element and a flighted element movable lengthwise along said trough element to move indiscriminately intermingled green bolls and relatively lighter-weight ripe bolls along said trough element from a receiving zone to a discharge zone, said trough element having in said discharge zone a first opening generally in alinement with the length of said trough element and affording a ripe boll exit, said trough further having a second opening ahead of and offset laterally to one side of said trough element from the first opening and affording a green boll exit; one of said elements being inclined laterally of the length of the trough element and downhill toward the green boll exit to influence all bolls gravitationally toward said green boll exit; and means counteracting said influence on only the ripe bolls to cause said ripe bolls to revert to the flighted portion to continue on to and through the ripe boll exit.

References Cited in the file of this patent

UNITED STATES PATENTS

| | | |
|---|---|---|
| 844,620 | Saunders | Feb. 19, 1907 |
| 1,159,168 | Broome | Nov. 2, 1915 |
| 2,366,705 | Berry | Jan. 9, 1945 |
| 2,502,817 | Bennett | Apr. 4, 1950 |
| 2,609,912 | Engel | Sept. 9, 1952 |
| 2,612,993 | Levesque | Oct. 7, 1952 |
| 2,699,867 | Kitten et al. | Jan. 18, 1955 |